United States Patent
Kao et al.

(10) Patent No.: US 9,280,418 B2
(45) Date of Patent: Mar. 8, 2016

(54) MEMORY DEVICE IMPLEMENTING REDUCED ECC OVERHEAD

(71) Applicant: Integrated Silicon Solution, Inc., Milpitas, CA (US)

(72) Inventors: Wing-Hin Kao, San Jose, CA (US); Jongsik Na, San Ramon, CA (US)

(73) Assignee: Integrated Silicon Solution, Inc., Milpitas, CA (US)

(*) Notice: Subject to any disclaimer, the term of this patent is extended or adjusted under 35 U.S.C. 154(b) by 310 days.

(21) Appl. No.: 13/957,251

(22) Filed: Aug. 1, 2013

(65) Prior Publication Data
US 2015/0039844 A1 Feb. 5, 2015

(51) Int. Cl.
G06F 12/02 (2006.01)
G06F 11/10 (2006.01)

(52) U.S. Cl.
CPC .................. G06F 11/1048 (2013.01)

(58) Field of Classification Search
CPC .............................. G06F 11/00; G06F 11/1048
See application file for complete search history.

(56) References Cited

U.S. PATENT DOCUMENTS

2004/0237023 A1* 11/2004 Takahashi et al. ............ 714/768
2008/0195894 A1* 8/2008 Schreck et al. ................ 714/34

* cited by examiner

Primary Examiner — Yong Choe
(74) Attorney, Agent, or Firm — Van Pelt, Yi & James LLP

(57) ABSTRACT

A memory device using error correction code (ECC) implements a memory array parallel read-write method to reduce the storage overhead required for storing ECC check bits. The memory array parallel read-write method stores incoming address and data into serial-in parallel-out (SIPO) address registers and write data registers, respectively. The stored data are written to the memory cells in parallel when the SIPO registers are full. ECC check bits are generated for the block of parallel input data stored in the write data registers. During the read operation, a block of read out data corresponding to the read address are read from the memory cells in parallel and stored in read registers. ECC correction is performed on the block of read out data before the desired output data is selected for output.

15 Claims, 6 Drawing Sheets

MEMORY DEVICE IMPLEMENTING REDUCED ECC OVERHEAD

BACKGROUND OF THE INVENTION

Modern day semiconductor memories have been produced with very high storage capacities (hundreds of millions of bits) with scaling down of transistors and the power source voltage. However, an incremental increase in storage capacity with low power source voltage tends to reduce the reliability of these memory devices. For example, the scaling down of transistor has reduced the capacitance in each memory cell, often resulting in random one-bit error due to cosmic radiation or alpha radiation. These random one-bit errors occur frequently enough that such errors can no longer be ignored. The increase in the number of cells in memory devices tends to reduce the mean time to failure (MTTF) of the entire memory device. As a result, the level of reliability required for the memory device become increasingly stringent. In some applications, semiconductor memory devices have been implemented with error correction to improve the reliability of the memory devices.

Errors in semiconductor memory devices are normally classified as "soft" errors and "hard" errors. Soft errors are random, non-repetitive and non-permanent change in the state of a memory cell. Soft errors are caused by occasional electrical noise or are induced by radiation, such as cosmic rays, that affects a very limited number of memory cells at a time, and these soft errors may be recovered in the next writing cycle. Hard errors are, instead, a permanent physical failure because of a fault present in the memory device. In practice, hard errors are much less frequent than soft errors.

Error correction code (ECC) is a technique that can be used to reduce the effects of soft errors in memory devices. In some cases, ECC can prove useful for the purpose of recovering some hard errors in the memory device. A well know error correction code is the Hamming code, which appends a series of check bits to a data word as the data word is stored in the memory device. Upon a read operation, the retrieved check bits are compared to recalculated check bits to detect and to locate single bit error. By adding more check bits and appropriately overlapping the subsets of data bits represented by the check bits, these error correcting codes may provide for multiple error corrections and detection. However, ECC requires memory space to store the parity check bits. In particular, the amount of parity check bits can become significant as memory size increases. Most large capacity memory devices often do not have memory space available to store these additional ECC bits. For example, for a memory device with 32 or 36 input-output (I/O), the memory overhead for the ECC bit can exceed 30%.

BRIEF DESCRIPTION OF THE DRAWINGS

Various embodiments of the invention are disclosed in the following detailed description and the accompanying drawings.

DETAILED DESCRIPTION

Figure 1:
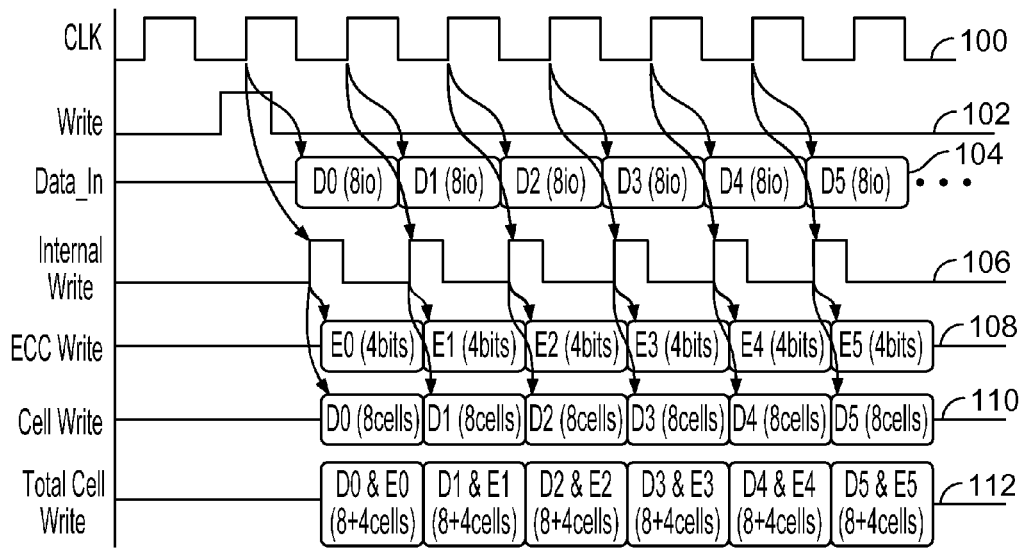
FIG. 1 is a timing diagram illustrating the write operation of a conventional burst mode synchronous SDR (single data rate) memory device implementing ECC.

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a memory device using error correction code (ECC) implements a memory array parallel read-write method to reduce the storage overhead required for storing ECC check bits. More specifically, the memory array parallel read-write method stores incoming address and data into serial-in parallel-out (SIPO) address registers and write data registers, respectively. The stored data are written to the memory cells in parallel when the SIPO registers are full. In particular, ECC check bits are generated for the block of input data stored in the write data registers. During the read operation, a block of data corresponding to the read address are read from the memory cells in parallel and stored in read registers for error checking and correction. The verified read data is then provided to a parallel-in-serial-out (PISO) read buffer and a read logic circuit selects the desired output data based on the read address. The memory array parallel read-write method reduces the size of the memory overhead required to store the ECC check bits.

As thus configured, the amount of memory space required to store ECC check bits is reduced significantly. First, the size of the ECC check bits reduces as the size of the data word increases. For example, for each 8-bit data word, a 4-bit ECC is used. However, when three 8-bit data words are combined, resulting in a 24-bit data word, a 5-bit ECC is sufficient. Thus, combining data words into a larger size block for generating ECC reduces the number of ECC check bits and achieves memory space efficiency. Second, the efficacy of the ECC diminishes only slightly as the size of the data word increases. Thus, the ECC memory overhead can be reduced without sacrificing data integrity.

The ECC overhead reduction method of the present invention enables ECC to be applied in large capacity memories with reduced ECC memory storage. For example, when a memory device with 36 input-output (I/O) is configured in four 9-I/O quarter memory core, the memory device will need four bits of ECC check bits per quarter memory core. The ECC core overhead is 30.77%. However, when the ECC overhead reduction method of the present invention is implemented and a block of three input data is written in a parallel write operation, a memory device with 36 I/O may be configured with four 27-I/O quarter memory cores. Such a memory device needs only five bits of ECC check bits per quarter memory core. The ECC core overhead is thus reduced to 15.63%.

FIG. 1 is a timing diagram illustrating the write operation of a conventional burst mode synchronous SDR (single data rate) memory device implementing ECC. Referring to FIG. 1, the burst mode SDR memory device is operating under the control of a clock signal CLK (curve 100). In a burst write operation, a Write signal (curve 102) is asserted to write a burst of input data Data_In (curve 104) to the memory device. For example, as shown in FIG. 1, data D0 to D5, etc., each being an 8-bit data word, are to be written to the memory device in a burst write operation. In response to the Write signal (curve 102) being asserted, the memory device initiates a series of Internal Write signal (curve 106) triggered on the rising edge of the clock signal CLK following the assertion of the Write signal. Each pulse of the Internal Write signal causes a data word to be written to the memory cells of the memory device (curve 110). In the present illustration, the memory device implements a half cycle latency write operation. That is, the input data Data_In (curve 104) is inserted a half cycle delay with respect to rising edge of the corresponding clock signal CLK (curve 100) following the Write signal assertion. The Internal Write signal is also asserted a half cycle after the rising edge of the clock signal CLK.

In response to the rising edge of the Internal Write signal (curve 106), the input data Data_in (such as D0 to D5) is written to memory cells in the memory array, typically to the memory core designated for storing input data. For each 8-bit data word being written, a 4-bit ECC data (curve 108) is generated. The ECC data is written to the memory device also in response to the Internal Write signal. The ECC data is usually to an ECC memory area of the memory device designated for storing the ECC data.

Accordingly, for each data write operation, the total number of data bits being written to the memory array for each data word is the sum of ECC data and the input data Data-in which is 12 bits in the present example (curve 112). Thus, under the conventional burst write scheme, ⅓ of the memory array is dedicated for ECC memory storage and the ECC overhead is 33.33%.

Figure 2:
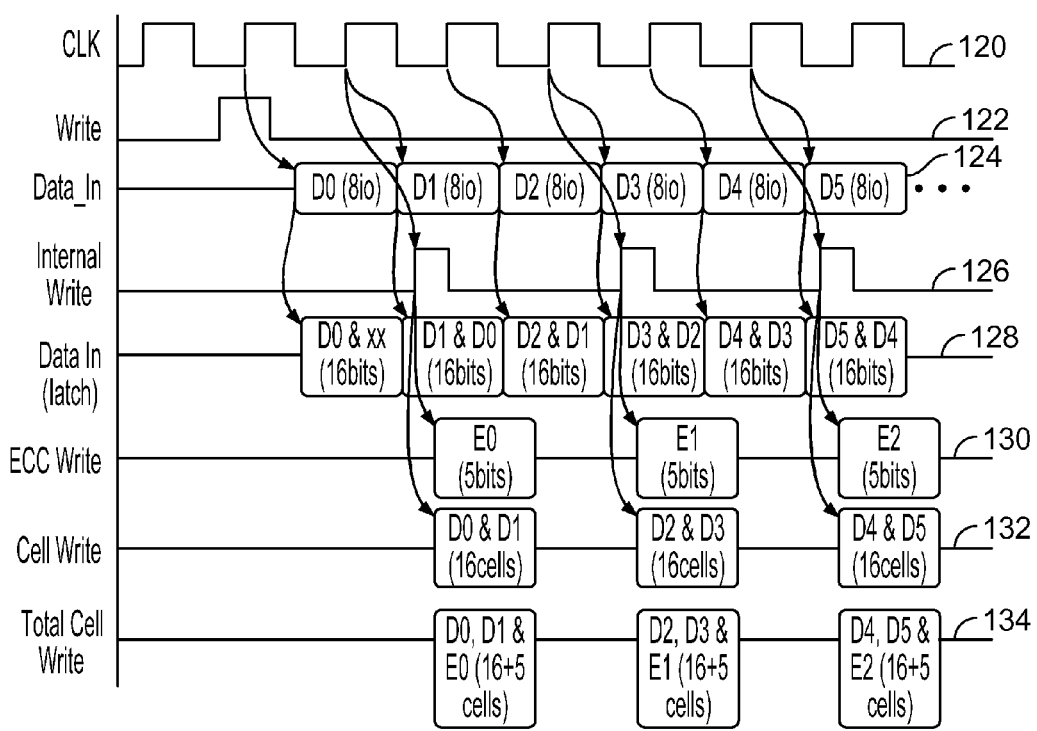
FIG. 2 is a timing diagram illustrating the write operation of a burst mode synchronous SDR (single data rate) memory device using ECC and implementing a memory array parallel read-write method according to one embodiment of the present invention.

FIG. 2 is a timing diagram illustrating the write operation of a burst mode synchronous SDR (single data rate) memory device using ECC and implementing a memory array parallel read-write method according to one embodiment of the present invention. Referring to FIG. 2, the burst mode SDR memory device is operating under the control of a clock signal CLK (curve 120). In a burst write operation, a Write signal (curve 122) is asserted to write a burst of input data Data_In (curve 124) to the memory device. For example, as shown in FIG. 2, data D0 to D5, etc., each being an 8-bit data word, are to be written to the memory device in a burst write operation. In the present illustration, the memory device implements a half cycle latency write operation. That is, the input data Data_In (curve 124) is inserted a half cycle delay with respect to rising edge of the corresponding clock signal CLK (curve 120) following the Write signal assertion.

In the present embodiment, the memory array parallel read-write method implements serial-in-parallel-out (SIPO) address and write data registers that are two data words deep to store two input data words received serially on the Data_In signal. Following the Write signal being asserted, the input data D0, D1 and so on (curve 124) are latched into the SIPO write data registers (curve 128) at each clock signal CLK. When the SIPO write data registers are two data words deep, two data words are shifted in to fill the write data registers in two clock cycles. For instance, at the first clock cycle after the Write signal assertion, data D0 is latched into the write data registers. At the second clock cycle, data D1 and D0 are latched into the write data registers. At the third clock cycle, data D1 and D2 are latched into the write data registers. At the fourth clock cycle, data D2 and D3 are latched into the write data registers.

In response to the Write signal (curve 122) being asserted, the memory device initiates a series of Internal Write signal (curve 126) triggered on the rising edges of the clock signal CLK. More specifically, when the memory array parallel read-write method is implemented using SIPO write data registers that are two data words deep, the Internal Write signal (curve 126) is triggered at every other rising edge of the clock signal CLK. Accordingly, following the rising edge of the Write signal (curve 122), the Internal Write signal (curve 126) is triggered on the second rising edge of the clock signal CLK and subsequent pulses of the Internal Write signal (curve 126) is triggered at every other rising edge of the clock signal CLK. Each pulse of the Internal Write signal causes the data words stored in the SIPO write data registers to be written to the memory cells of the memory device in parallel (curve 132). In the present illustration, the Internal Write signal is also asserted a half cycle after every other rising edge of the clock signal CLK.

In response to the rising edges of the Internal Write signal (curve 126), a pair of input data words (such as D0 and D1) stored in the SIPO write data registers is written in parallel to memory cells in the memory array, typically to the memory core designated for storing input data. Also in response to the Internal Write signal (curve 126), ECC check bits (curve 130) are generated for each pair of data words stored in the SIPO data write registers. In the present illustration, each data word is 8 bits and thus each pair of data words is 16 bits. For each block of 16-bit data words, a 5-bit ECC data word (curve 130) is generated. For instance, for data words D0 and D1, a 5-bit ECC data word E0 is generated; and for data words D2 and D3, a 5-bit ECC data word E1 is generated. The ECC data words are written to the memory device in response to the Internal Write signal. The ECC data words are usually written to an ECC memory area of the memory device designated for storing the ECC data.

Accordingly, for each data write operation, the total number of data bits being written to the memory array is the sum of ECC data word and the pair of input data words which is 16+5 bits or 21 bits in the present example (curve 134). Thus, under the memory array parallel read-write method of the present invention, only about 24% of the memory array is dedicated for ECC memory storage and the ECC overhead is reduced from 33.33% in the conventional case to 23.81% in the present embodiment.

Figure 3:
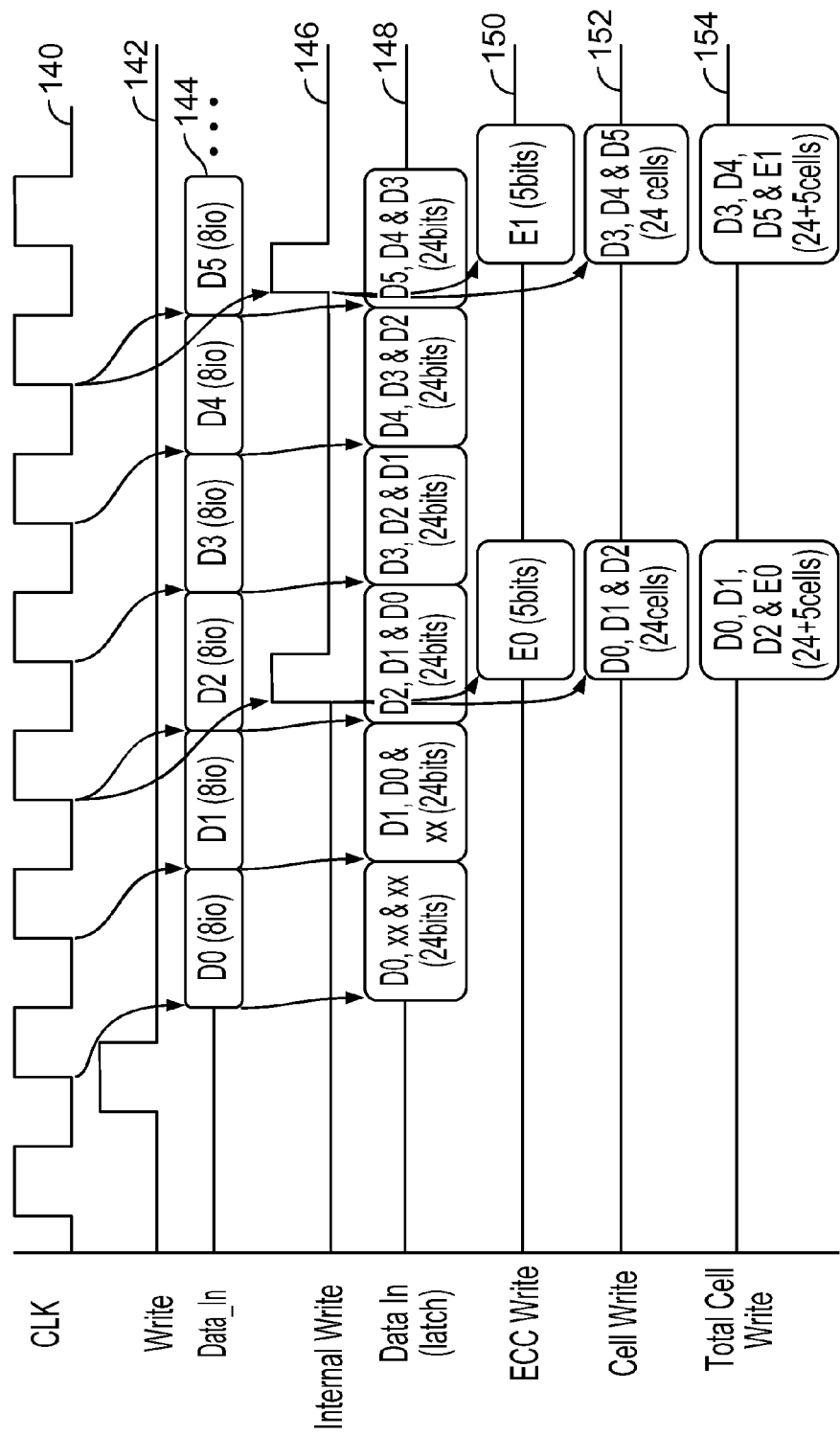
FIG. 3 is a timing diagram illustrating the write operation of a burst mode synchronous SDR (single data rate) memory device using ECC and implementing a memory array parallel read-write method according to another embodiment of the present invention.

FIG. 3 is a timing diagram illustrating the write operation of a burst mode synchronous SDR (single data rate) memory device using ECC and implementing a memory array parallel read-write method according to another embodiment of the present invention. Referring to FIG. 3, the burst mode SDR memory device is operating under the control of a clock signal CLK (curve 140). In a burst write operation, a Write signal (curve 142) is asserted to write a burst of input data Data_In (curve 144) to the memory device. For example, as shown in FIG. 3, data D0 to D5, etc., each being an 8-bit data word, are to be written to the memory device in a burst write operation. In the present illustration, the memory device implements a half cycle latency write operation. That is, the input data Data_In (curve 144) is inserted a half cycle delay with respect to rising edge of the corresponding clock signal CLK (curve 140) following the Write signal assertion.

In the present embodiment, the memory array parallel read-write method implements serial-in-parallel-out (SIPO) address and write data registers that are three data words deep to store three data words received serially on the Data_In signal. Following the Write signal being asserted, the input data D0, D1, D2 and so on (curve 144) are latched into the SIPO write data registers (curve 148) at each clock signal CLK. The SIPO write data registers are three data words deep and three data words are shifted in to fill the write data registers in three clock cycles. For instance, at the first clock cycle after the Write signal assertion, data D0 is latched into the write data registers. At the second clock cycle, data D1 and D0 are latched into the write data registers. At the third clock cycle, data D0, D1 and D2 are latched into the write data registers.

In response to the Write signal (curve 142) being asserted, the memory device initiates a series of Internal Write signal (curve 146) triggered on the rising edges of the clock signal CLK. More specifically, when the memory array parallel read-write method is implemented using SIPO write data registers that are three data words deep, the Internal Write signal (curve 146) is triggered at every third rising edge of the clock signal CLK. Accordingly, following the rising edge of the Write signal (curve 142), the Internal Write signal (curve 146) is triggered on the third rising edge of the clock signal CLK and subsequent pulses of the Internal Write signal (curve 126) is triggered at every third rising edge of the clock signal CLK. Each pulse of the Internal Write signal causes the data words stored in the SIPO write data registers to be written to the memory cells of the memory device in parallel (curve 152). In the present illustration, the Internal Write signal is also asserted a half cycle after every other rising edge of the clock signal CLK.

In response to the rising edges of the Internal Write signal (curve 146), three input data words (such as D0, D1 and D2) are written in parallel to memory cells in the memory array, typically to the memory core designated for storing input data. Also in response to the Internal Write signal (curve 146), ECC check bits (curve 150) are generated for the three data words stored in the SIPO registers. In the present illustration, each data word is 8 bits and thus a set of three data words is 24 bits. For each block of 24-bit data words, a 5-bit ECC data word (curve 150) is generated. For instance, for data words D0, D1 and D2, a 5-bit ECC data word E0 is generated; and for data words D3, D4 and D5, a 5-bit ECC data word E1 is generated. The ECC data words are written to the memory device in response to the Internal Write signal. The ECC data words are usually written to an ECC memory area of the memory device designated for storing the ECC data.

Accordingly, for each data write operation, the total number of data bits being written to the memory array is the sum of ECC data word and the set of three input data words which is 24+5 bits or 29 bits in the present example (curve 154). Thus, under the memory array parallel read-write method of the present invention, only about 17% of the memory array is dedicated for ECC memory storage and the ECC overhead is reduced from 33.33% in the conventional case to 17.24% in the present embodiment.

Figure 4:
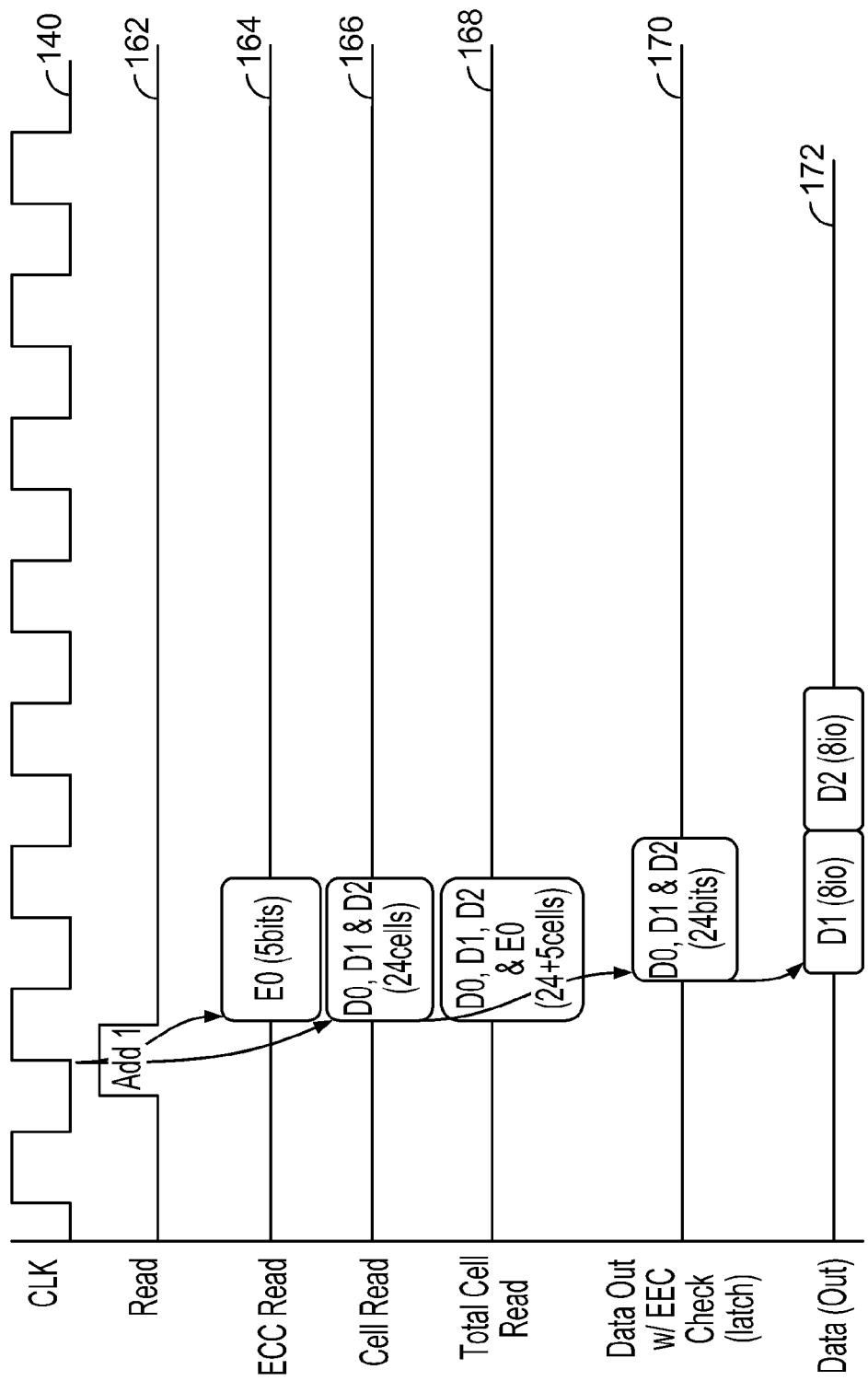
FIG. 4 is a timing diagram illustrating the read operation of the burst mode synchronous SDR (single data rate) memory device of FIG. 3 according to one embodiment of the present invention.

FIG. 4 is a timing diagram illustrating the read operation of the burst mode synchronous SDR (single data rate) memory device of FIG. 3 according to one embodiment of the present invention. Referring to FIG. 4, the memory device implements a memory array parallel read-write method that uses read registers that can store three data words read out in parallel. The burst mode SDR memory device is operating under the control of the clock signal CLK (curve 140). In a burst read operation, a Read signal (curve 162) is asserted to read a block of stored data (curve 166) from the memory device. The Read signal is also accompanied by the read address (such as, Addr1), not shown in FIG. 4. In the present example, data D0, D1 and D2, each being an 8-bit data word, are read out of the memory device in parallel and stored in the read registers during the burst read operation. Meanwhile, the ECC data word (curve 164) associated with the read out data is also retrieved. Thus, in the present example, each read operation read out three data words (24 bits) and the associated ECC data word (5 bits) (curve 168).

ECC logic circuit applies error checking and correction to the block of read out data D0, D1 and D2. After error checking and/or correction, the block of read out data (curve 170) is provided to a parallel-in-serial-out (PISO) read buffer and a read logic circuit selects the desired data word for output as the Data_Out signal (curve 172). For example, with the read address Addr1 provided, the read logic circuit selects the data word D1 for output on the output terminal.

Figure 5:
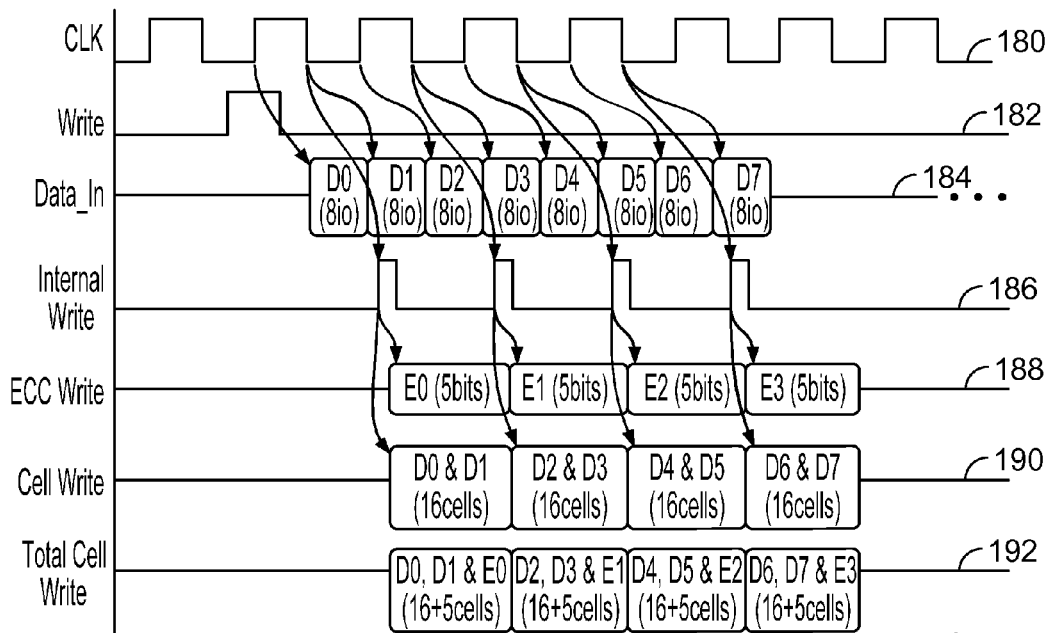
FIG. 5 is a timing diagram illustrating the write operation of a conventional burst mode synchronous DDR (double data rate) memory device implementing ECC.

FIG. 5 is a timing diagram illustrating the write operation of a conventional burst mode synchronous DDR (double data rate) memory device implementing ECC. Referring to FIG. 5, the burst mode DDR memory device is operating under the control of a clock signal CLK (curve 180). In a burst write operation, a Write signal (curve 182) is asserted to write a burst of input data Data_In (curve 184) to the memory device. For example, as shown in FIG. 5, data D0 to D7, etc., each being an 8-bit data word, are to be written to the memory device in a burst write operation. In a double data rate memory device, the input data Data_In is provided on both clock edges of the clock signal CLK. That is, an input data word is provided for each rising edge and falling edge of the clock signal CLK and a pair of data words is written to the memory for each internal write cycle. In response to the Write signal (curve 182) being asserted, the memory device initiates a series of Internal Write signal (curve 186) triggered on the falling edge of the clock signal CLK following the assertion of the Write signal. Each pulse of the Internal Write signal causes a pair of data words to be written to the memory cells of the memory device (curve 190). In the present illustration, the memory device implements a half cycle latency write operation. That is, the input data Data_In (curve 184) is inserted a half cycle delay with respect to rising edge of the corresponding clock signal CLK (curve 180) following the Write signal assertion. Thus, data D0 is inserted a half cycle after the rising edge of the clock signal CLK while data D1 is inserted a full cycle after the rising edge or a half cycle after the falling edge of the clock signal CLK. The Internal Write signal is also asserted a half cycle after the falling edge of the clock signal CLK.

In response to the rising edge of the Internal Write signal (curve 186), a pair of input data Data_in (such as D0 to D7) is written to memory cells in the memory array under the DDR scheme, typically to the memory core designated for storing input data. For each pair of 8-bit data words being written, a 5-bit ECC data (curve 188) is generated. The ECC data is written to the memory device also in response to the Internal Write signal. The ECC data is usually to an ECC memory area of the memory device designated for storing the ECC data.

Accordingly, for each data write operation, the total number of data bits being written to the memory array for each data word is the sum of ECC data and the input data Data-in which is 16+5=21 bits in the present example (curve 192). Thus, under the conventional burst write scheme for a DDR memory device, 24% of the memory array is dedicated for ECC memory storage.

Figure 6:
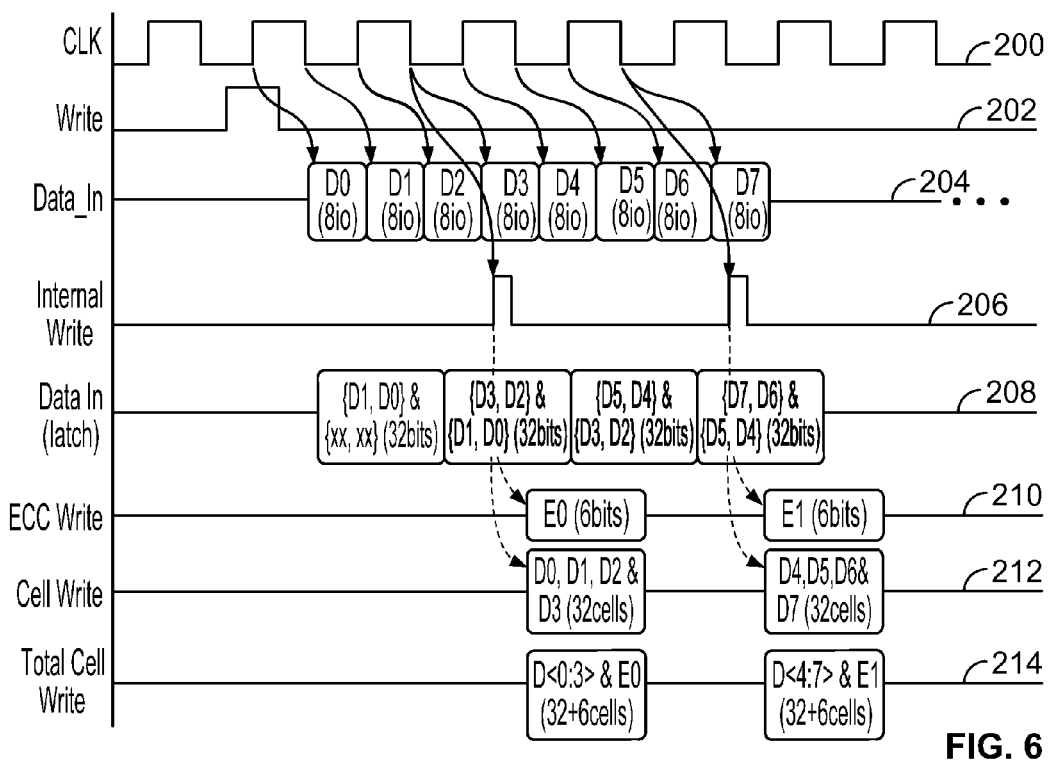
FIG. 6 is a timing diagram illustrating the write operation of a burst mode synchronous DDR (double data rate) memory device using ECC and implementing a memory array parallel read-write method according to one embodiment of the present invention.

FIG. 6 is a timing diagram illustrating the write operation of a burst mode synchronous DDR (double data rate) memory device using ECC and implementing a memory array parallel read-write method according to one embodiment of the present invention. Referring to FIG. 6, the burst mode DDR memory device is operating under the control of a clock signal CLK (curve 200). In a burst write operation, a Write signal (curve 202) is asserted to write a burst of input data Data_In (curve 204) to the memory device. For example, as shown in FIG. 6, data D0 to D7, etc., each being an 8-bit data word, are to be written to the memory device in a burst write operation. In a double data rate memory device, the input data Data_In is provided on both clock edges of the clock signal CLK. That is, an input data word is provided for each rising edge and falling edge of the clock signal CLK and a pair of data words, or a double-data-word, is written to the memory for each Internal write cycle. In the present illustration, the memory device implements a half cycle latency write operation. That is, the input data Data_In (curve 204) is inserted a half cycle delay with respect to rising edge of the corresponding clock signal CLK (curve 200) following the Write signal assertion. Thus, data D0 is inserted a half cycle after the rising edge of the clock signal CLK while data D1 is inserted a full cycle after the rising edge or a half cycle after the falling edge of the clock signal CLK.

In the present embodiment, the memory array parallel read-write method implements serial-in-parallel-out (SIPO) address and write data registers that are two double-data-words deep to store four input data words received serially on the Data_In signal. Following the Write signal being asserted, the input data D0, D1 and so on (curve 204) are latched into the SIPO write data registers (curve 208) at each rising and falling edges of the clock signal CLK. When the SIPO write data registers are two double-data-words deep, four data words are shifted in to fill the write data registers in two clock cycles. For instance, at the first falling edge of the clock signal after the Write signal assertion, data D0 and D1 are latched into the write data registers. At the second falling edge of the clock signal, data D2 and D3 are also latched into the write data registers. At this point, the write data registers are full with four data words D0 to D3.

In response to the Write signal (curve 202) being asserted, the memory device initiates a series of Internal Write signal (curve 206) triggered on the falling edges of the clock signal CLK. More specifically, when the memory array parallel read-write method is implemented using SIPO write data registers that are two double-data-words deep, the Internal Write signal (curve 206) is triggered at every two falling edges of the clock signal CLK. Accordingly, following the rising edge of the Write signal (curve 202), the Internal Write signal (curve 206) is triggered on the second falling edge of the clock signal CLK and subsequent pulses of the Internal Write signal (curve 206) is triggered at every two falling edges of the clock signal CLK. Each pulse of the Internal Write signal causes the data words stored in the SIPO write data registers to be written to the memory cells of the memory device in parallel (curve 212). In the present illustration, the Internal Write signal is also asserted a half cycle after every two falling edges of the clock signal CLK.

In response to the rising edges of the Internal Write signal (curve 206), a pair of double data words (such as D0-D3) stored in the SIPO write data registers is written in parallel to memory cells in the memory array, typically to the memory core designated for storing input data. Also in response to the Internal Write signal (curve 206), ECC check bits (curve 210) are generated for each pair of double data words stored in the SIPO data write registers. In the present illustration, each data word is 8 bits and thus each pair of double data words is 32 bits. For each block of 32 bits data words, a 6-bit ECC data word (curve 210) is generated. For instance, for data words D0 to D3, a 6-bit ECC data word E0 is generated; and for data words D4 to D7, a 6-bit ECC data word E1 is generated. The ECC data words are written to the memory device in response to the Internal Write signal. The ECC data words are usually written to an ECC memory area of the memory device designated for storing the ECC data.

Accordingly, for each data write operation, the total number of data bits being written to the memory array is the sum of ECC data word and the pair of input data words which is 32+6 bits or 38 bits in the present example (curve 214). Thus, under the memory array parallel read-write method of the present invention, only about 15.8% of the memory array is dedicated for ECC memory storage and the ECC overhead is reduced from 24% in the conventional case to 15.8% in the present embodiment.

Figure 7:
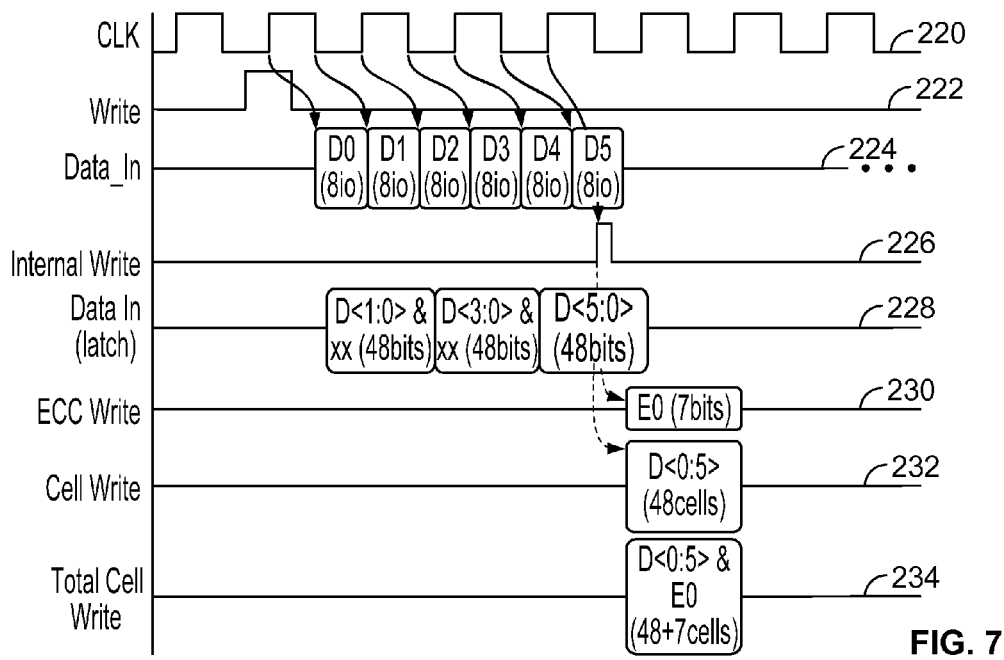
FIG. 7 is a timing diagram illustrating the write operation of a burst mode synchronous DDR (double data rate) memory device using ECC and implementing a memory array parallel read-write method according to an alternate embodiment of the present invention.

FIG. 7 is a timing diagram illustrating the write operation of a burst mode synchronous DDR (double data rate) memory device using ECC and implementing a memory array parallel read-write method according to an alternate embodiment of the present invention. Referring to FIG. 7, the burst mode DDR memory device is operating under the control of a clock signal CLK (curve 220). In a burst write operation, a Write signal (curve 222) is asserted to write a burst of input data Data_In (curve 224) to the memory device. For example, as shown in FIG. 7, data D0 to D5, etc., each being an 8-bit data word, are to be written to the memory device in a burst write operation. In a double data rate memory device, the input data Data_In is provided on both clock edges of the clock signal CLK. That is, an input data word is provided for each rising edge and falling edge of the clock signal CLK and a pair of data words, or a double-data-word, is written to the memory for each Internal write cycle. In the present illustration, the memory device implements a half cycle latency write operation. That is, the input data Data_In (curve 224) is inserted a half cycle delay with respect to rising edge of the corresponding clock signal CLK (curve 220) following the Write signal assertion. Thus, data D0 is inserted a half cycle after the rising edge of the clock signal CLK while data D1 is inserted a full cycle after the rising edge or a half cycle after the falling edge of the clock signal CLK.

In the present embodiment, the memory array parallel read-write method implements serial-in-parallel-out (SIPO) address and write data registers that are three double-data-words deep to store six input data words received serially on the Data_In signal. Following the Write signal being asserted, the input data D0, D1 and so on (curve 224) are latched into the SIPO write data registers (curve 228) at each rising and falling edges of the clock signal CLK. When the SIPO write data registers are three double-data-words deep, six data words are shifted in to fill the write data registers in three clock cycles. For instance, at the first falling edge of the clock signal after the Write signal assertion, data D0 and D1 are latched into the write data registers. At the second falling edge of the clock signal, data D2 and D3 are also latched into the write data registers. At the third falling edge of the clock signal, data D4 and D5 are also latched into the write data registers. At this point, the write data registers are full with six data words D0 to D5.

In response to the Write signal (curve 222) being asserted, the memory device initiates a series of Internal Write signal (curve 226) triggered on the falling edges of the clock signal CLK. More specifically, when the memory array parallel read-write method is implemented using SIPO write data registers that are three double-data-words deep, the Internal Write signal (curve 226) is triggered at every three falling edges of the clock signal CLK. Accordingly, following the rising edge of the Write signal (curve 222), the Internal Write signal (curve 202) is triggered on the third falling edge of the clock signal CLK and subsequent pulses of the Internal Write signal will be triggered at every three falling edges of the clock signal CLK. Each pulse of the Internal Write signal causes the data words stored in the SIPO write data registers to be written to the memory cells of the memory device in parallel (curve 232). In the present illustration, the Internal Write signal is also asserted a half cycle after every three falling edges of the clock signal CLK.

In response to the rising edges of the Internal Write signal (curve 226), a block of three double data words (such as D0-D5) stored in the SIPO write data registers is written in parallel to memory cells in the memory array, typically to the memory core designated for storing input data. Also in response to the Internal Write signal (curve 226), ECC check bits (curve 230) are generated for each block of three double data words stored in the SIPO data write registers. In the present illustration, each data word is 8 bits and thus each set of three double data words is 48 bits. For each block of 48 bits data words, a 7-bit ECC data word (curve 230) is generated. For instance, for data words D0 to D5, a 7-bit ECC data word E0 is generated. The ECC data words are written to the memory device in response to the Internal Write signal. The ECC data words are usually written to an ECC memory area of the memory device designated for storing the ECC data.

Accordingly, for each data write operation, the total number of data bits being written to the memory array is the sum of ECC data word and the pair of input data words which is 48+7 bits or 55 bits in the present example (curve 234). Thus, under the memory array parallel read-write method of the present invention, only about 12.7% of the memory array is dedicated for ECC memory storage and the ECC overhead is reduced from 24% in the conventional case to 12.7% in the present embodiment.

Figure 8:
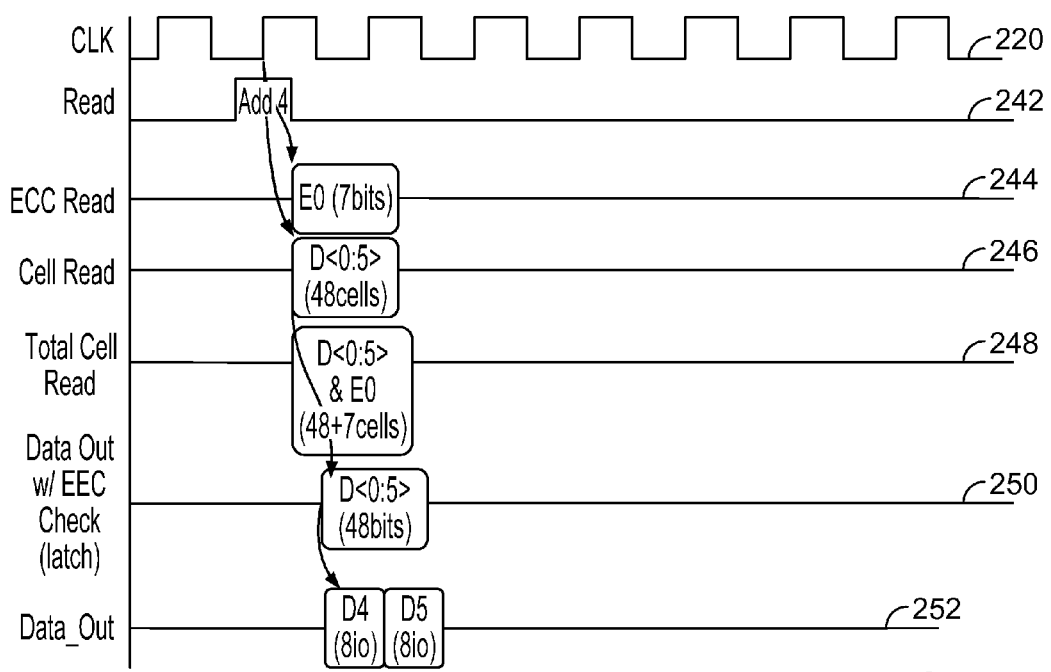
FIG. 8 is a timing diagram illustrating the read operation of the burst mode synchronous DDR (double data rate) memory device of FIG. 7 according to one embodiment of the present invention.

FIG. 8 is a timing diagram illustrating the read operation of the burst mode synchronous DDR (double data rate) memory device of FIG. 7 according to one embodiment of the present invention. Referring to FIG. 8, the memory device implements a memory array parallel read-write method that uses read registers that can store three double data words read out in parallel. The burst mode DDR memory device is operating under the control of the clock signal CLK (curve 220). In a burst read operation, a Read signal (curve 242) is asserted to read a block of stored data (curve 246) from the memory device. The Read signal is also accompanied by the read address (such as, Addr4), not shown in FIG. 4. In the present example, data D0 to D5, each being an 8-bit data word, are read out of the memory device in parallel and stored in the read registers during the burst read operation. Meanwhile, the ECC data word (curve 244) associated with the read out data is also retrieved. Thus, in the present example, each read operation read out three double data words (48 bits) and the associated ECC data word (7 bits) (curve 248).

ECC logic circuit applies error checking and correction to the block of read out data D0-D5. After error checking and/or correction, the block of read out data (curve 250) is provided to a parallel-in-serial-out (PISO) read buffer and the read logic circuit selects the desired data word for output as the Data_Out signal (curve 252). For example, with the read address Addr4 provided, the read logic circuit selects the double data words D4 and D5 for output on the output terminal.

Figure 9:
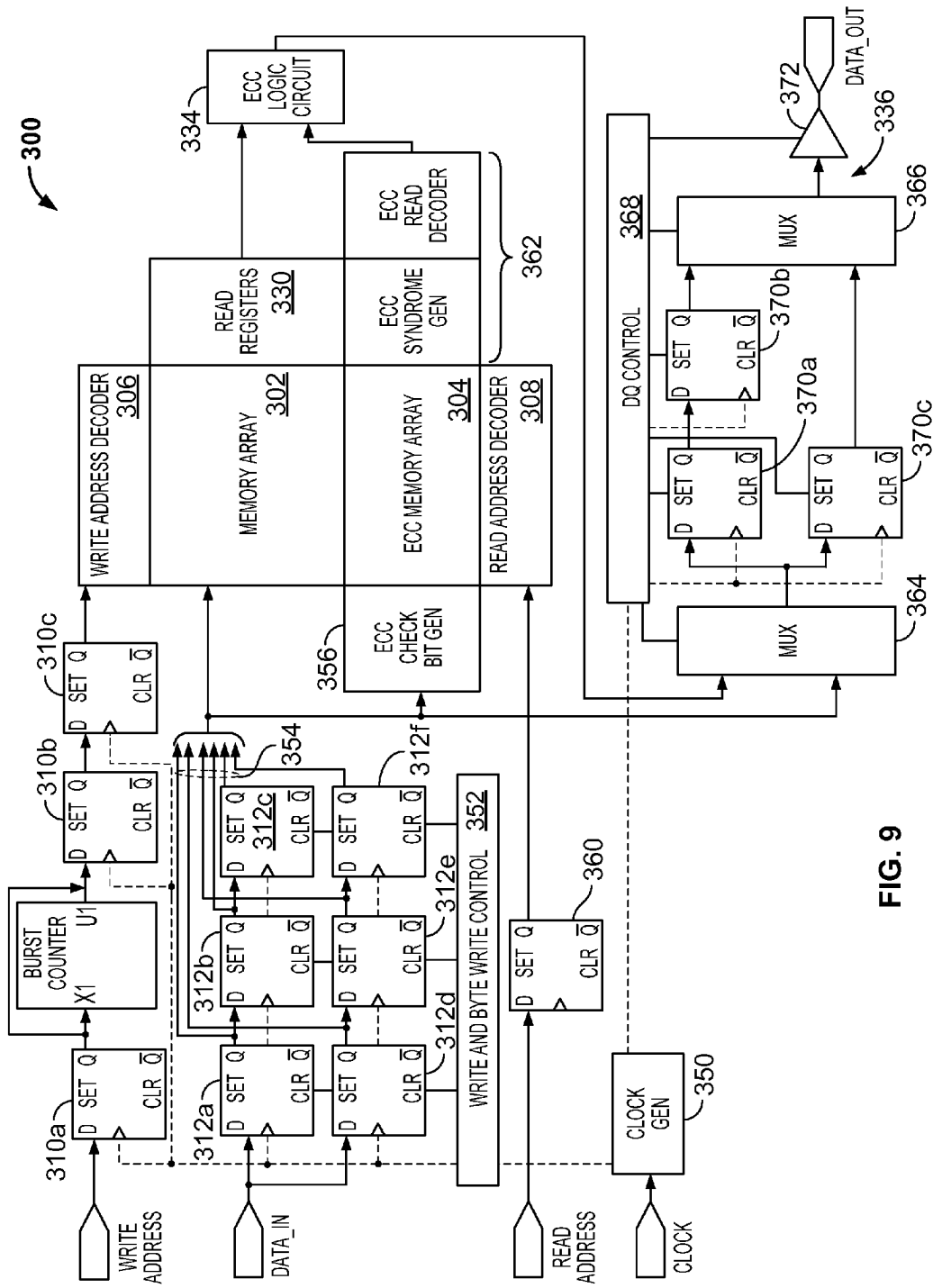
FIG. 9 is a schematic diagram of a burst mode synchronous DDR (double data rate) memory device using ECC and implementing a memory array parallel read-write method according to one embodiment of the present invention.

FIG. 9 is a schematic diagram of a burst mode synchronous DDR (double data rate) memory device using ECC and implementing a memory array parallel read-write method according to one embodiment of the present invention. FIG. 9 illustrates one exemplary configuration of a DDR memory device. Other configurations for the memory device are possible to implement the memory array parallel read-write method of the present invention. The DDR memory device shown in FIG. 9 is illustrative only and is not intended to be limiting.

Referring to FIG. 9, a burst mode synchronous DDR memory device 300 includes a memory array 302 for storing data and an ECC memory array 304 for storing ECC check bits. The memory device 300 includes a write address decoder 306 for receiving the incoming write address and decoding the write address to access the memory array 302. The memory device 300 also includes a read address decoder 308 for receiving the incoming read address and decoding the read address to access the memory array 302. The memory device 300 includes serial-in-parallel-out (SIPO) address registers 310 and write data registers 312 for receiving serial input data and writing a block of serial input data in parallel to the memory array 302. In the present illustration, the SIPO address and write data registers are three data words deep. The memory device 300 further includes read registers 330, ECC logic circuit 334 and a parallel-in-serial-out read buffer 336 to facilitate data read out from the memory array 302.

Memory device 300 is operating under an input clock signal Clock which is coupled to a clock generation circuit 350 to generate the clock signals for circuitry internal to the memory device. In the present illustration, the dashed lines denote the clock signal lines being coupled to various circuits of the memory device.

To write data into memory device 300, write addresses are provided to the write address terminal and the incoming write address are provided to the SIPO address register chain including registers 310a to 310c. The incoming write addresses are shifted into the register chain at each clock signal. In the present embodiment, after three clock cycles, the first write address is propagated down the address register chain to the last address register 310c. The last address register 310c provides the write address to the write address decoder 306.

In the present embodiment, memory device 300 is a DDR memory and therefore a pair of data words are written in or read out of the memory array at each read/write cycle. Accordingly, the write data registers includes two banks of write data registers 312a-c and 312d-e. The write data registers may be controlled by a write and byte write control circuit 352. The input data Data_In is coupled to the two banks of write data registers in parallel. The first bank of write data registers 312a-c stores the incoming data words receiving on the rising edge of the clock signal while the second bank of write data registers 312d-e stores the incoming data words receiving on the falling edge of the clock signal. After three clock cycles, six data words are loaded into the write data registers 312a-e. The data stored in the write data registers 312a-e are read out in parallel data lines 354 to be written to the memory array 302. In this manner, as the input data are received in a serial manner, the input data are latched so that a block of data words are written to the memory array 302 in parallel. The data words are stored in memory array 302 based on the addresses decoded by the write address decoder 306.

Meanwhile, the block of parallel data words are also provided to an ECC check bit generation circuit 356 to generate the ECC check bits for the block of data words. The ECC check bits are then stored in the ECC memory area 304. In this manner, ECC check bits are generated for a block of input data in parallel to reduce the ECC storage overhead.

In read operations, a read address is latched into a read address register 360 and the latched read address is then provided to the read address decoder 308. The read operation causes a block of data words to be read out in parallel from the memory array 302 and stored in the read registers 330. The corresponding ECC check bits from the ECC memory area 304 are also read out. The ECC check bits are processed an ECC processing circuit 362, such as an ECC syndrome generator and an ECC read decoder. The read out data from the read registers 330 and the ECC check bits are provided to an ECC logic circuit 334 to perform error checking and correction. The corrected read out data can then be provided to the parallel-in-serial-out read buffer 336 where the desired data word is selected as the output.

In the present illustration, the read buffer 336 includes a multiplexer 364 to select between the corrected read out data from the ECC logic circuit 334 or the parallel write data on parallel data lines 354. In some cases, the read operation may be performed on input data that has not been written into the memory array 302 yet but are in transit to the memory array. Accordingly, a data output control circuit 368 controls the multiplexer 364 to select either the data on the parallel data lines 354 in transit to be stored in the memory array 302 or the corrected read out data from the ECC logic circuit 334. In one embodiment, the data output control circuit 368 includes a comparison circuit configured to compare the write address and read address. If the read address matches the write address, indicating that the data currently being written into the memory array is also being read out, the data output control circuit 368 selects the write data from the parallel data lines 354 as the read out data. If the read address does not match the write address, the read address is provided to the read address decoder to proceed with the normal read operation. The data output control circuit 368 selects the read out data from the ECC logic circuit 334 as the read out data.

The selected read out data are provided to read data registers 370a-c. The read data registers 370a and 370b are arranged in two banks to accommodate the DDR read operation. The read data registers 370a-c convert the parallel read out data into a serial output data format. The data output control circuit 368 selects the desired output data using a multiplexer 366 and provides the selected data word for output as Data_Out. In some embodiments, a buffer 372 may be used to pass the output data to the output terminal.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A memory device, comprising:
a memory array comprising a first memory array area configured to store memory data and a second memory array area configured to store error correction code associated with the memory data;
a data input circuit comprising a set of serial-in-parallel-out write data registers, the data input circuit being configured to receive serial input data in response to a write signal and a write address, the serial input data being shifted into the write data registers in response to a clock signal, the data input circuit configured to convert the serial input data stored in the write data registers into a set of parallel input data, the parallel input data being provided to the memory array to be written to the first memory array area;
an error correction code (ECC) generation circuit configured to receive the set of the parallel input data and to generate an ECC data word associated with the set of parallel input data, the ECC data word being stored in the second memory array area;
a read data register coupled to the first memory array area, the read data register storing a set of read out data retrieved from the first memory array area in response to a read signal and a read address, the set of read out data having the same number of data words as the set of parallel input data;
an ECC logic circuit configured to receive an ECC data word associated with the set of read out data retrieved from the second memory array area, the ECC logic circuit configured to perform error checking and error correction on the set of read out data using the retrieved ECC data word; and
a data output circuit comprising a parallel-in-serial-out buffer configured to receive the set of corrected read out data and to select an output data from the set of corrected read out data corresponding to the read address.

2. The memory device of claim 1, wherein the memory device comprises a single data rate (SDR) random access memory device, and wherein the data input circuit is configured to shift the serial input data into the set of serial-in-parallel-out write data registers in response to a rising edge of the clock signal.

3. The memory device of claim 1, wherein the memory device comprises a double data rate (DDR) random access memory device, and wherein the data input circuit further comprises a first bank of serial-in-parallel-out write data registers and a second bank of serial-in-parallel-out write data registers, the data input circuit being configured to shift the serial input data into the first bank of serial-in-parallel-out write data registers in response to a rising edge of the clock signal and to shift the serial input data into the second bank of serial-in-parallel-out write data registers in response to a falling edge of the clock signal.

4. The memory device of claim 1, wherein the set of serial-in-parallel-out write data registers comprises a chain of three write data registers and the set of parallel input data comprises a set of three data words.

5. The memory device of claim 1, wherein the set of serial-in-parallel-out write data registers comprises a chain of two or more write data registers and the set of parallel input data comprises a set of two or more data words.

6. The memory device of claim 1, further comprising:
a data read out multiplexer configured to receive the set of parallel input data and the set of corrected read out data; and
a data output control circuit configured to provide the set of parallel input data to the data output circuit when the read address matches the write address and further configured to provide the set of corrected read out data to the data output circuit when the read address does not match the write address.

7. The memory device of claim 1, further comprising:
an ECC processing circuit coupled to the memory array to retrieve the ECC data word associated with the set of read out data from the second memory array area and to process the ECC data word.

8. The memory device of claim 1, wherein the memory device comprises one of a SRAM or DRAM.

9. A method in a memory device, comprising:
receiving a write signal and a write address;
receiving serial input data to be stored in a memory array of the memory device;
storing the serial input data into a set of serial-in-parallel-out write data registers in response to a clock signal;
providing a set of parallel input data from the set of write data registers;
storing the set of parallel input data in a first memory area of the memory array;
providing the set of parallel input data to an error correction code (ECC) generation circuit;
generating an ECC data word associated with the set of parallel input data;
storing the ECC data word in a second memory array area of the memory array;
retrieving a set of read out data from the first memory array area in response to a read signal and a read address, the set of read out data having the same number of data words as the set of parallel input data;
retrieving an ECC data word associated with the set of read out data from the second memory array area;
performing error checking and error correction on the set of read out data using the retrieved ECC data word; and
selecting an output data from the set of corrected read out data corresponding to the read address.

10. The method of claim 9, wherein the memory device comprises a single data rate (SDR) random access memory device, and wherein storing the serial input data into a set of write data registers in response to a clock signal comprises:
shifting the serial input data into the set of write data registers on a rising edge of the clock signal.

11. The method of claim 9, wherein the memory device comprises a double data rate (DDR) random access memory device, and wherein storing the serial input data into a set of write data registers in response to a clock signal comprises:
shifting the serial input data into a first bank of write data registers on a rising edge of the clock signal; and
shifting the serial input data into a second bank of write data registers on a falling edge of the clock signal.

12. The method of claim 9, wherein the set of serial-in-parallel-out write data registers comprises a chain of three write data registers.

13. The method of claim 9, wherein the set of serial-in-parallel-out write data registers comprises a chain of two or more write data registers.

14. The method of claim 9, further comprising:
comparing the read address and the write address;
in response to the read address matching the write address, selecting the output data from the set of parallel input data; and
in response to the read address not matching the write address, selecting the output data from the set of corrected read out data.

15. The method of claim 9, wherein the memory device comprises one of a SRAM or DRAM.

* * * * *